United States Patent
Malik et al.

(10) Patent No.: US 6,993,122 B2
(45) Date of Patent: *Jan. 31, 2006

(54) SYSTEM AND METHOD FOR CONSUMER-INITIATED BUSINESS SOLICITATION CALLING SYSTEM

(75) Inventors: Dale W. Malik, Dunwoody, GA (US); Robert A. Koch, Norcross, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 227 days.

This patent is subject to a terminal disclaimer.

(21) Appl. No.: 10/135,406

(22) Filed: May 1, 2002

(65) Prior Publication Data

US 2005/0213741 A1 Sep. 29, 2005

Related U.S. Application Data

(63) Continuation of application No. 09/317,217, filed on May 24, 1999, now Pat. No. 6,404,875.

(51) Int. Cl.
*H04M 3/42* (2006.01)

(52) U.S. Cl. .............................. 379/211.02; 379/211.03; 379/218.01

(58) Field of Classification Search ............ 379/211.01, 379/211.02, 211.03, 201.01, 210.01, 221.08, 379/221.09, 230, 265.02, 218.01
See application file for complete search history.

(56) References Cited

U.S. PATENT DOCUMENTS

| | | | | | |
|---|---|---|---|---|---|
| 4,839,919 | A | * | 6/1989 | Borges et al. | 379/93.23 |
| 5,452,350 | A | * | 9/1995 | Reynolds et al. | 379/221.07 |
| 5,638,424 | A | * | 6/1997 | Denio et al. | 379/88.18 |
| 5,724,411 | A | * | 3/1998 | Eisdorfer et al. | 379/93.23 |
| 5,802,160 | A | * | 9/1998 | Kugell et al. | 379/211.04 |
| 6,389,117 | B1 | * | 5/2002 | Gross et al. | 379/88.23 |
| 6,411,686 | B1 | * | 6/2002 | Porter et al. | 379/88.18 |

* cited by examiner

*Primary Examiner*—Bing Q. Bui
(74) *Attorney, Agent, or Firm*—Withers & Keys, LLC

(57) ABSTRACT

The present invention discloses a telecommunications system initiating telephone connections between, for example, a consumer and a service provider based on the criteria provided by the consumer and the services available from the service provider. The system is suitable for consumers requiring direct communication with a staff member of a service provider capable of meeting the consumer's service requirements. The system compiles a prioritized list of service providers matching the consumer's criteria. Starting with the first service provider on the list, the system rings the service provider and determines whether or not a staff member answers the call. If the line is busy or the call is not answered by a staff member, the system moves on to the next service provider on the list until a service provider having a staff member is located. Once such a service provider is located, the system rings the consumer and connects the two parties. If the system cannot locate such a service provider, the consumer is given an opportunity to repeat or modify the search.

16 Claims, 8 Drawing Sheets

SYSTEM AND METHOD FOR CONSUMER-INITIATED BUSINESS SOLICITATION CALLING SYSTEM

This application is a continuation of application Ser. No. 09/317,217, filed May 24, 1999, now U.S. Pat. No. 6,404,875.

BACKGROUND

1. Field of the Invention

The present invention relates generally to telecommunications systems.

More particularly, the present invention relates to an advanced intelligent network system for facilitating consumer-initiated business solicitation.

2. Background of the Invention

Recent advances in telecommunications systems, e.g., voicemail, automated call processing and answering machines, allow communications between parties even when one of the parties is not available. Such communications are not performed in real-time and cannot provide assurance that the absent party actually receives the communication.

When a consumer urgently needs to contact a business or other concern, on a real-time basis, a voicemail system is usually the last thing he or she wants to hear. Usually, one of several outcomes occurs: (1) Consumer hangs up, attempts a call to another business (result: consumer unhappy, business loses potential customer); (2) Consumer leaves a message, consumer waits for a response that is not returned in a timely fashion, consumer then calls another business (result: consumer very unhappy, business loses potential customer, business loses consumer's friends as potential customers as well); (3) Consumer leaves message, waits for response, gets response only to find out business can't solve problem presented (result: customer unhappy, business wastes time where no potential for customer existed); or (4) Consumer leaves a message, gets a prompt and helpful response (both consumer and business are happy). A service providing assurance to consumers that they will be able to speak with a live staff member at a business is needed for more efficient communications.

Another problem faced by consumers today is locating the "right" business, i.e., one that can meet the consumer's requirements. In the current art, consumers select service providers based on word-of-mouth recommendations, advertising, or through random selection from a directory service such as the "Yellow Pages" published by telephone service providers. With the exception of the word-of-mouth method, there is limited assurance that the service provider selected can meet the consumer's requirements. Moreover, with any of these selection methods, the consumer has no assurance that the service provider they choose will be available to serve that consumer when the requirement arises and within the consumer's specific constraints. A service providing assurance that consumers will be put in contact with such a service provider is needed for more efficient communications.

One way to provide the desired service is to employ a large staff to screen consumer calls, locate appropriate service providers, ensure that the service provider selected is available and coordinate contact between the parties. The consumer would be shielded from the annoyance of having to make multiple phone calls to locate even a single service provider. However, such a service would be costly and would be subject to the same problems of attempting calls to service providers that use answering machines, do not answer the call or are unable to provide the requested service. In addition, if the service's staff are all busy when the consumer calls, the consumer is placed on hold, must call back later or leave a message.

SUMMARY OF THE INVENTION

The present invention utilizes an Advanced Intelligent Network ("AIN") to provide an automated service for facilitating customer-initiated business, or service provider, solicitation. AIN systems are described in U.S. Pat. No. 5,701,301, which is hereby incorporated by reference. FIG. 1a shows the key components of the AIN used in the present invention. FIG. 1b is a flowchart showing the four functions, or stages, comprising the present invention. The steps comprising each function are shown in more detail in the flowcharts in FIGS. 2a and 2b. The steps described herein can be performed by computer-readable program code operating on the various AIN components as described below.

The Information Collection function begins when a caller. e.g., a consumer, dials a telephone number connecting the caller to the system. The system then prompts for and collects information from the caller about the nature of the service required. The system offers the caller a variety of options and sub-options through a series of cascading menus. The Information Collection function is complete when the caller is instructed to hang up and wait for a return call.

In the Match function, the system consults a pre-existing database to compare the caller's requirements with information about potential service providers. The system then creates a prioritized list of service providers capable of meeting that caller's needs.

In the Locate Provider function, the system calls the first service provider on the list. If the line is busy or not answered, the system calls the next service provider. The system continues calling service providers until a service provider's line is answered. If the line is answered, the system then determines if the call was answered by a person or by an automated system. If the line was answered by an automated system, the system drops that call and moves on to the next service provider on the list. If the system exhausts the prioritized list of service providers without locating a human attendant, the caller is notified and asked whether or not the system should repeat the search using the original criteria. The caller is also given the option to modify the criteria and to have the system perform a new search.

The final function is the Connect Caller function. This function is performed only if the system locates a service provider with a human attendant available. In that case, the system rings the caller's telephone number and connects the call to the service provider's answered line.

It is an object of the present invention to provide an automated service provider locator system.

It is a further object of the present invention to use an Advanced Intelligent Network to provide the automated service provider locator system.

It is another object of the present invention to provide a system to facilitate efficient communications between consumers and service providers.

These and other objects of the present invention are described in greater detail in the detailed description of the invention, the appended drawings and the attached claims.

DETAILED DESCRIPTION OF THE INVENTION

Figure 1A:
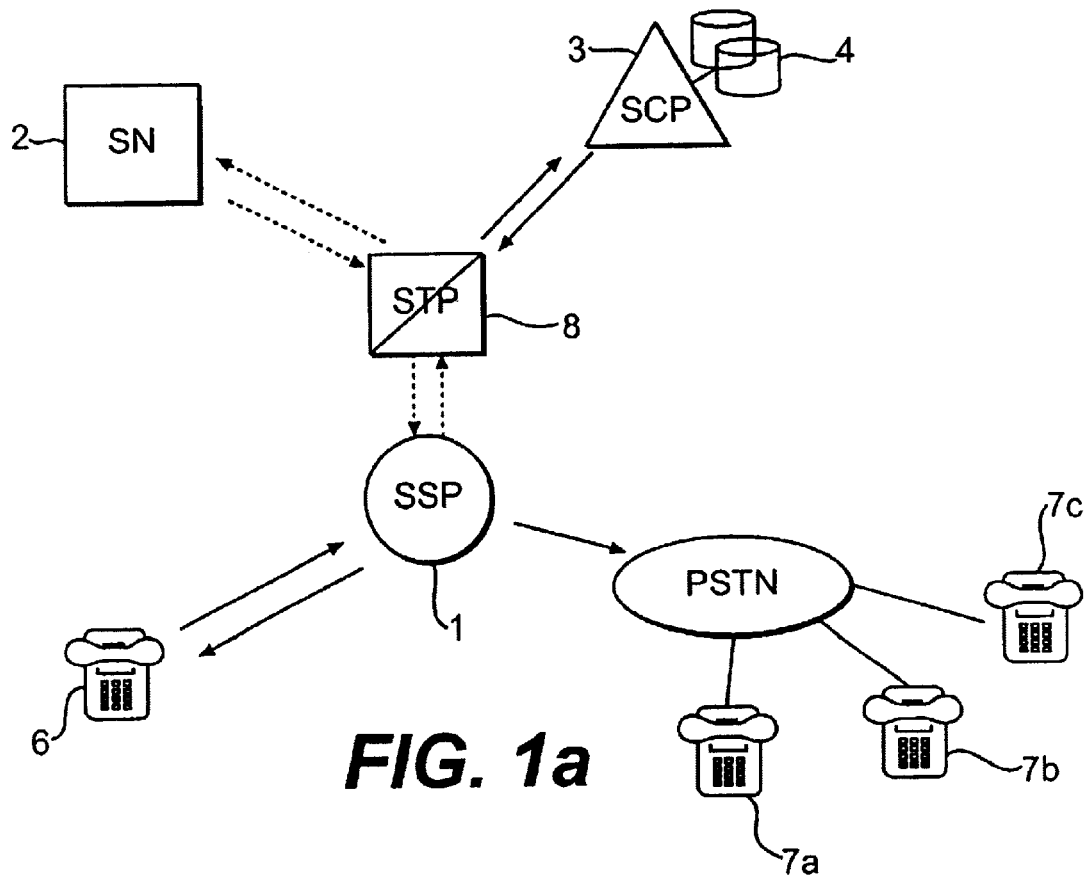
FIG. 1a is a schematic diagram showing the key components of an AIN used in an embodiment of the present invention.
Figure 1B:
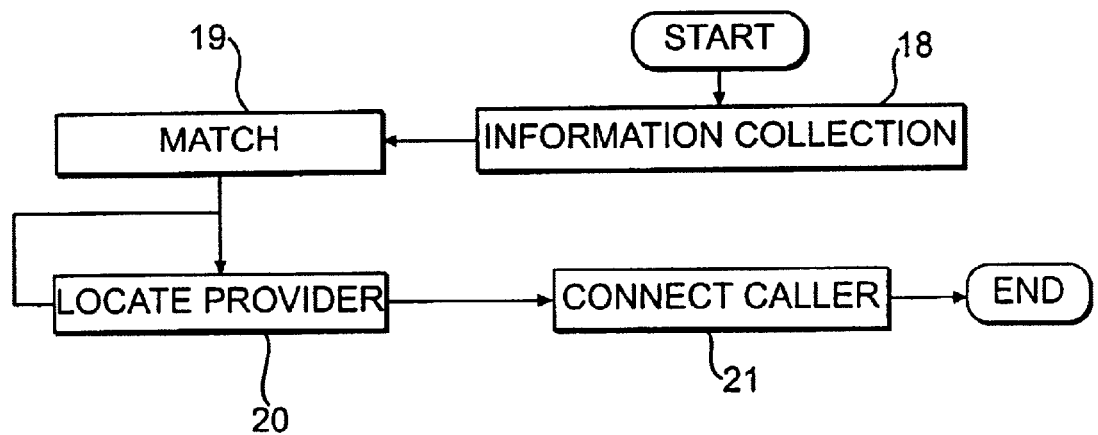
FIG. 1b is a flowchart showing the primary stages of a general embodiment of the present invention.

FIG. 1a is a schematic diagram of the elements of an Advanced Intelligent Network ("AIN") used to implement a preferred embodiment of the present invention. FIG. 1b is a flowchart showing the four basic functions performed in a preferred embodiment of the present invention.

During Information Collection function 18, a caller dials the telephone number assigned to the system of the present invention using telephone 6 connected to Service Switching Point ("SSP") 1. SSP 1 transfers the call to Signaling Transfer Point ("STP") 8 for routing to Service Node ("SN") 2 based on the telephone number dialed. In a preferred mode, SN 2 is a computer system such as the Lucent Technologies Star Server FT Model 3200 or Model 3300. SN 2 issues a series of queries to the caller regarding the caller's requirements. SN 2 collects the information provided by the caller and constructs an Information Code encoding the caller's requirements. SN 2 then sends the Information Code and other information, described below, to Service Control Point ("SCP") 3, via STP 8.

SCP 3 then initiates Match function 19 by consulting database 4 to construct prioritized list of service providers meeting the caller's criteria supplied in Information Collection function 18. For example, the prioritized list might contain service providers 7a, 7b and 7c in the following prioritized order: 7b, 7a, 7c. SCP 3 instructs SSP 1 to contact the first provider on the prioritized list, i.e., service provider 7b.

In Locate Provider function 20, SSP 1 dials the telephone number for the service provider as instructed by SCP 3. SSP 1 reports back to SCP 3 when the line is answered, not answered, or if the line is busy. If the call is answered, SCP 3 determines, as described below, whether or not the call was answered by a person or by a machine. If the call was answered by a person, then SCP 3 enters Connect Caller function 21 and instructs SSP 1 to dial the caller's telephone number and connect the caller to the service provider.

If the call is not answered by a person, SCP 3 drops the call and moves to the next service provider on the list, e.g., service provider 7a. Additionally, any time the service provider's line is not answered or is busy, SCP 3 moves to the next provider on the prioritized list and instructs SSP 1 to contact that provider. SCP 3 continues down the prioritized list until a line is answered by a human being, or the list is exhausted. If the list is exhausted before a human being is contacted, SCP 3 instructs SN 2 to contact and inform the caller.

Figure 2A:
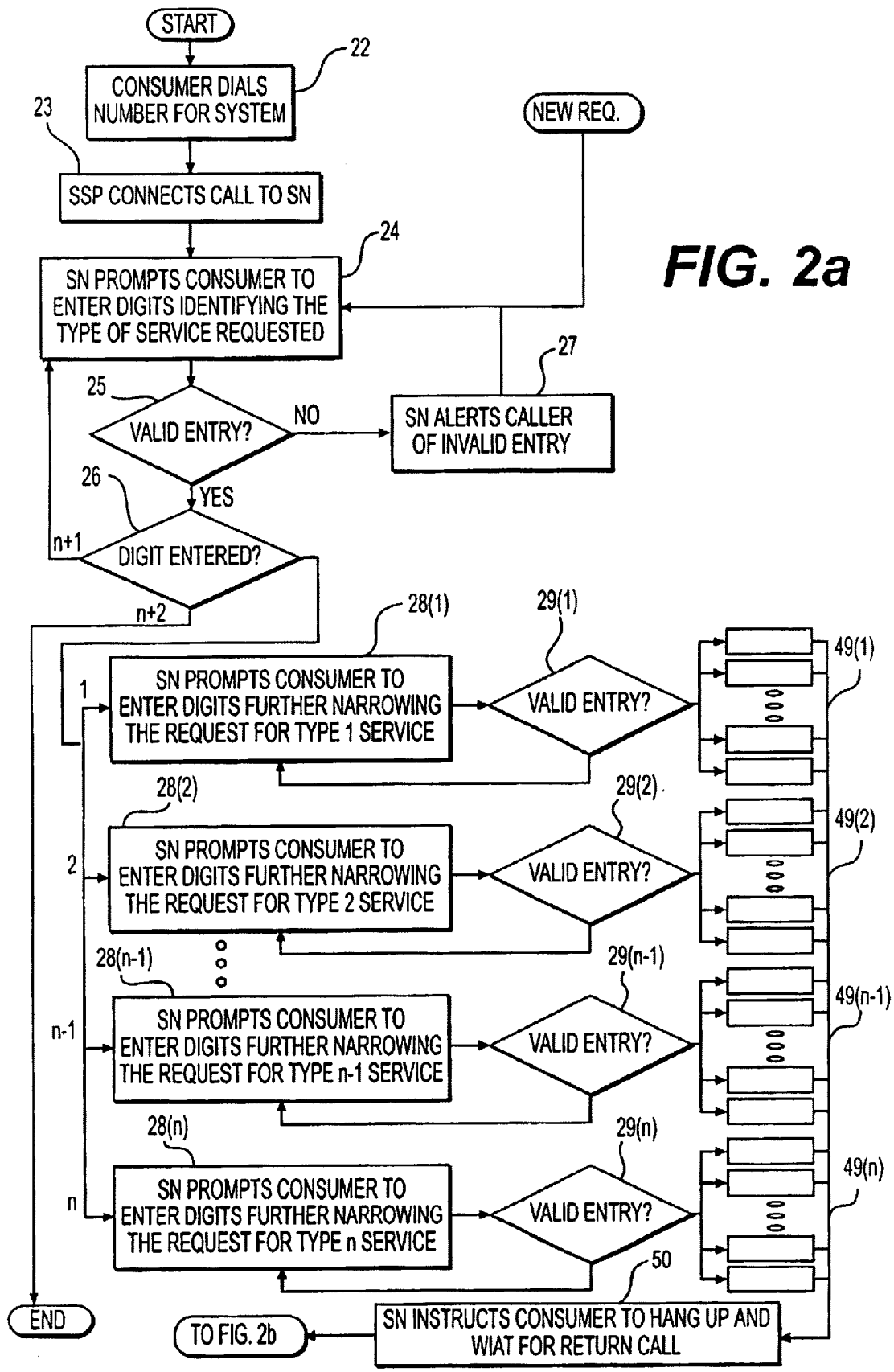
FIGS. 2a and 2b are flowcharts showing the steps undertaken during each stage of a general embodiment of the present invention.
Figure 2B:
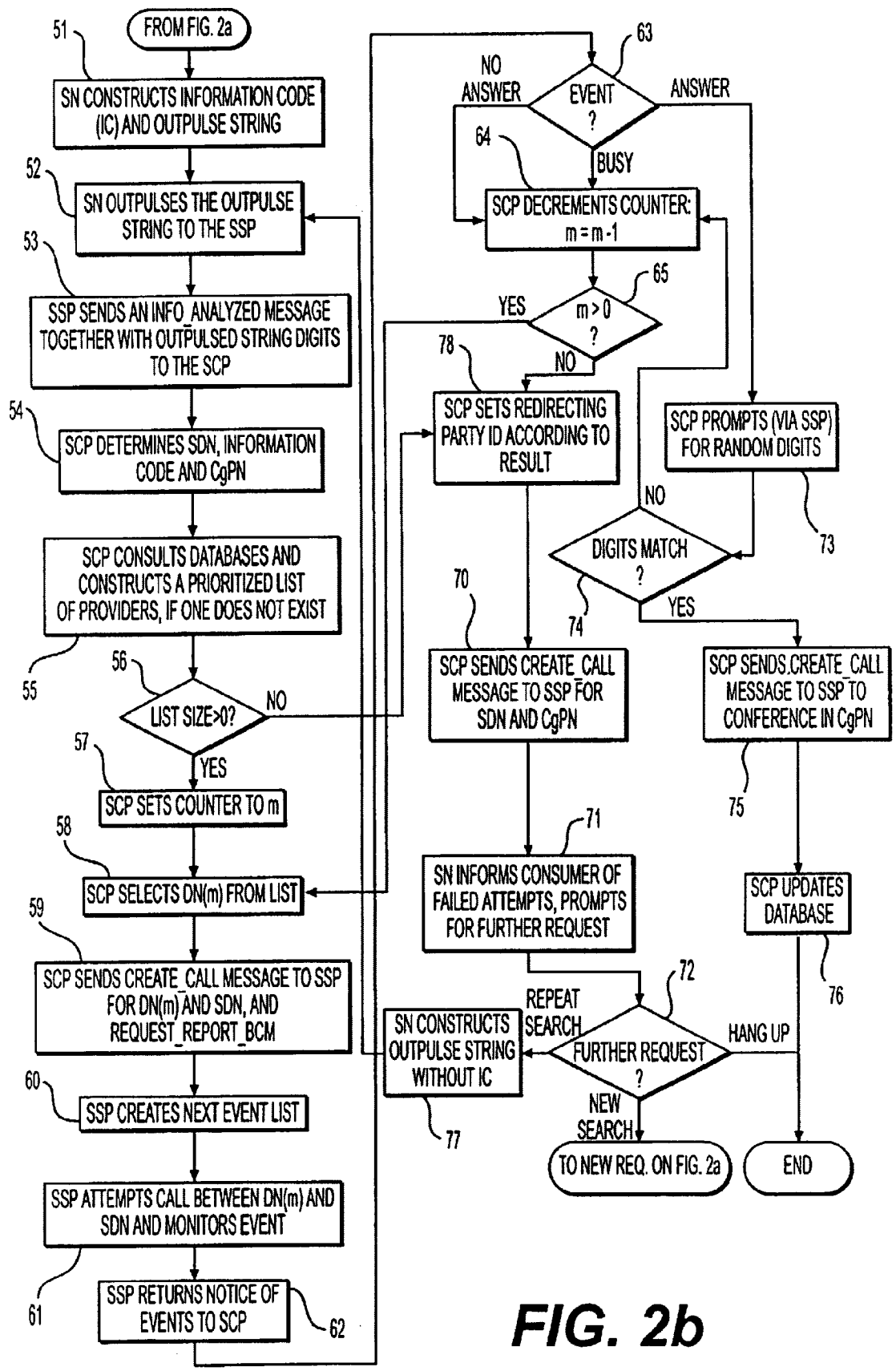

Description of a Preferred Embodiment FIG. 2a is a flowchart showing the steps undertaken during each function of a preferred embodiment of the present invention. The flowchart in FIG. 2a begins at step 22 and is continued in FIG. 2b at step 51. In step 22, a caller dials the telephone number for the system. In step 23, SSP 1 connects the call to SN 2, passing on customary information such as the Calling Party Number "CgPN." In step 24, SN 2 plays a pre-recorded message for the consumer. This pre-recorded message provides the consumer with a menu of options and prompts the consumer to enter the digit(s) corresponding to his service request. In this preferred embodiment, the message in step 24 offers, for example, 'n' different service types. The message also instructs the consumer to enter the number 'n+1' to repeat the message, or the number 'n+2' to exit the system and hang up.

In step 25, SN 2 determines if any digits have been entered within a predefined amount of time, and validates any digits received. If a valid response is received, SN 2 proceeds to step 26. If the response was invalid or null, SN 2 plays an announcement in step 27 alerting the consumer that the selection was not valid. After informing the consumer of the error, SN 2 repeats step 24 and again prompts the consumer to identify the service requested.

Once a valid response is received, in step 26, SN 2 interprets the number(s) entered by the consumer and decides the next step. As described above, if 'n+1' is received, SN 2 repeats step 24 and prompts the consumer to identify the service requested. If the number 'n+2' is received, SN 2 hangs up. For each of the other valid choices, SN 2 moves on to the corresponding next step. For example, if the consumer enters a '1' to select a particular type of service, SN 2 proceeds with step 28(1). Similarly, if the consumer enters the number 'n' SN 2 proceeds to step 28(n) in FIG. 2a. For each possible choice, i.e., each possible response 1,2 . . . n, the system offers a cascading menu of choices to narrow down the request as represented in steps 28(1) through 28(n) and 49(1) through 49(n) in FIG. 2a. For example, in step 28(1), SN 2 prompts the consumer for additional information regarding the service requested. In step 29(1), SN 2 verifies the validity of the entry and continues narrowing the request. SN 2 may be programmed to successively narrow down the request by repeating steps analogous to steps 28(1) . . . 28(n), 29(1) . . . 29(n) and 49(1) . . . 49(n).

After cascading through a series of narrowing stages. SN 2 constructs an Information Code in step 50. In this embodiment, the Information Code may be up to ten digits in length and is a code corresponding to the consumer's specific request. Continuing on to FIG. 2b, in step 51, SN 2 constructs an outpulse string, up to thirty-two digits in length. Preferably, the string has the form: CXXXXXXXXXXYYYYYYYYYYZZZZZZZZZZ#, where C is the customized dialing plan code, X . . . X is a 10-digit Surrogate Directory Number (SDN), Y . . . Y is the CgPN and Z . . . Z is the Information Code from step 50. The SDN is a telephone number assigned to SN 2 and will be used as a surrogate number by SCP 3 during the Locate Provider function. In this embodiment, C is limited to a single digit to allow for a maximum length of the Information Code of 10 digits.

In step 52, SN 2 outpulses the string to SSP 1 for action. The telephone line used by SN 2 in this step is provisioned with a customized dialing plan trigger at SSP 1. Thus, in step 53, SSP 1 sends an Info Analyzed query to SCP 3. The parameters of the query include the combination of digits making up the outpulse string. In step 54, SCP 3 receives the outpulse string and, based on the value of C, takes appropriate action. In this case, C signals SCP 3 to retrieve the SDN, the CgPN and the Information Code from the string and continues on to step 55.

One or more databases 4 of service providers are maintained at SCP 3. These databases may contain a wide range of information such as the types of services provided, costs, the provider's service area, the provider's hours of operation, and the like. They may also include collateral information such as how often the system has been successful in establishing human contact with that service provider, how often the service provider has been selected, consumer feedback, or other data relevant to the prioritization process.

In step 55, SCP 3 uses the Information Code to compare the caller's identified need with the database information and constructs a prioritized list of potential service providers. The method of prioritizing can be based on a number of factors, including, for example, the proximity of the provider, the costs, that provider's history in responding to calls for services, or the specific types of services offered. In step 56, SCP 3 evaluates whether or not there are any potential service providers meeting the consumer's criteria.

If no service providers can be matched to the consumer's requirements, the SCP drops to step 78 where it changes the Redirecting Party ID field to a special value, e.g., 111-111-1111. Next, SCP 3 moves on to step 70 and sends a Create_Call message to SSP 1 instructing SSP 1 to establish a call between the SDN on SN 2 and the CgPN of the consumer, providing the new Redirecting Party ID. Once this call is established, as indicated in step 71, SN 2 interprets the Redirecting Party ID as indicating that no service providers in the database meet the consumer's criteria. As a result, SN 2 plays an announcement informing the consumer that no service providers matched the information provided. In step 72. SN 2 then offers the consumer an opportunity to make a new request or exit the service. If the consumer chooses to make a new request, SN 2 returns to step 24 in FIG. 2a where the consumer is lead through the menu of choices a second time.

Once SCP 3 has determined that the list of potential service providers has at least one entry, it continues with step 57. In step 57. SCP 3 initially sets a counter, m, to the lesser of the number of entries on the list or the number of some predefined maximum list size limit. Moving to step 58, SCP 3 selects the first dialed number, denoted in this embodiment as DN(m), from the priority list. In step 59. SCP 3 sends a Create_Call message to SSP 1 instructing it to establish a call between SDN and DN(m). The Create_Call message in step 59 includes a Request_Report_BCM, instructing SSP 1 to monitor and report back if any of the following events occur: call answered, line busy, or no answer. SSP 1 creates a "Next Event List" in step 60 in response to the Request_Report_BCM instruction.

SSP 1 attempts to create a call between DN(m) and SDN in step 61. SSP 1 monitors the progress of the call for one of the three events on the Next Event List (answer, busy, no answer). When one of those events happens, SSP 1 informs SCP 3 of the event's occurrence as indicated in step 62. In step 63, SCP 3 acts according to the type of event reported by SSP 1. If the event was a busy, or no answer condition, SCP 3 decrements the counter (m=m−1) in step 64, then determines whether or not the list has been exhausted, step 65. If the counter is still positive, then the list has not been exhausted and SCP 3 returns to step 58 to retrieve the next service provider on the list. DN(m). If the list was exhausted, then SCP 3 drops to step 78, where it changes the Redirecting Party ID to some other special value, e.g., 222-222-2222 before moving on to step 70. In step 70, SCP 3 sends a Create_Call message as described above. When SN 2 receives this call in step 71, it interprets the new Redirecting Party ID and acts accordingly. In this case, the Redirecting Party ID would be the value corresponding to the situation where no service provider meeting the consumer's requirement could be contacted. SN 2 plays the appropriate message so informing the consumer, then provides the consumer the option to repeat the same search, to request a new search or to exit the system.

In step 72, if the consumer requests a new search, the SN 2 returns to step 24 on FIG. 2a where it prompts the consumer for the required information, and repeats the steps described above.

In step 72, if the consumer chooses to repeat the same search, SN 2 moves on to step 77 where it constructs a second outpulse string to send to SSP 1. This second outpulse string has the same form as the earlier outpulsed string, except the Information Code is null. Thus, the outpulse string is now: CXXXXXXXXXXXYYYYYYYYYY#, where the C, X . . . X and Y . . . Y are the customized dial plan code, the surrogate number and the consumer's telephone number, respectively. The system returns to step 52 where SN 2 outpulses the string to SSP 1. In step 53, SSP 1 sends an Info_Analyzed message to SCP 3. SCP 3 repeats step 54 to determine the value of the SDN, CgPN and the Information Code. In step 55, SCP 3 recognizes the null Information Code as a signal that the prioritized list for this consumer has already been constructed. In subsequent steps, SCP 3 again attempts to contact the service providers on the list in the manner described above.

If the event returned in step 62 was the answer event, in step 63 SCP 3 moves on to step 73. In steps 73 and 74, SCP 3 determines whether or not the line was answered by an automated system. In a preferred embodiment, SCP 3 issues a Send_to_Resource message to SSP 1 instructing it to prompt the service provider's answeror to enter some randomly pre-determined set of digits. SSP 1 collects the digits entered by the answeror and sends them back to SCP 3. In step 74, SCP 3 compares the digits entered, if any, to the random digits requested. If the digits do not match, SCP 3 presumes that the answeror was an automated system. In that case, SCP 3 drops the call and returns to step 64 to decrement the counter and retrieve the next provider's telephone number. If the digits entered are a match for the digits requested, SCP 3 informs the service provider to standby for connection to the consumer.

In step 75, SCP 3 sends a Create_Call message instructing SSP 1 to conference the consumer, i.e., CgPN, into the existing call between the service provider, DN(m), and the surrogate number, SDN. At the same time, SCP 3 instructs SSP 1 to tear down the leg to the SDN as soon as the consumer answers his or her telephone. If the consumer's line is now busy or not answered, the service provider is played a message stating the consumer is no longer available and instructing the service provider to hang up. In an alternate embodiment, in step 75, SCP 3 could also send SSP 1 a Monitor_for_Change message if the consumer's line was busy. In this embodiment, SSP 1 informs SCP 3 when the consumer's line changes from busy to available. Upon receiving this notification, SCP 3 instructs SSP 1 to create a call between the surrogate number and the last service provider contacted. If that service provider is still available, the consumer is conferenced into the call as described above.

In the step 76, SCP 3 updates the database concerning the success of the call. Similar record-keeping steps could be performed prior to step 64 to track failed attempts to contact service providers.

The following example is provided to illustrate certain embodiments of the present invention. It is not to be construed as limiting the invention in any way.

Specific Example

A specific example illustrating the above described steps is provided in FIGS. 3a through 3e. Steps in this example that are identical to the steps described in the preferred embodiment above use the identical numeric labeling.

In this example, the consumer calls the system by dialing the system's telephone number, e.g., 222-333-4444, as shown in step 22. The consumer's number, 222-555-6666, is the Calling Party Number ("CgPN"). SSP 1 routes the call to SN 2, passing on the CgPN, step 23. SN 2, in step 24, plays for the consumer a pre-recorded message such as:

Welcome to the Automatic Locator Service. Please listen to the following menu and select the service you require: For plumbing services, please press 1; For delivery services, please press 2; For auto services please press 3; For lawn or garden services, please press 4. To repeat this menu, please press 5. To exit the service, please press 6 or hang up now.

Figure 3A:
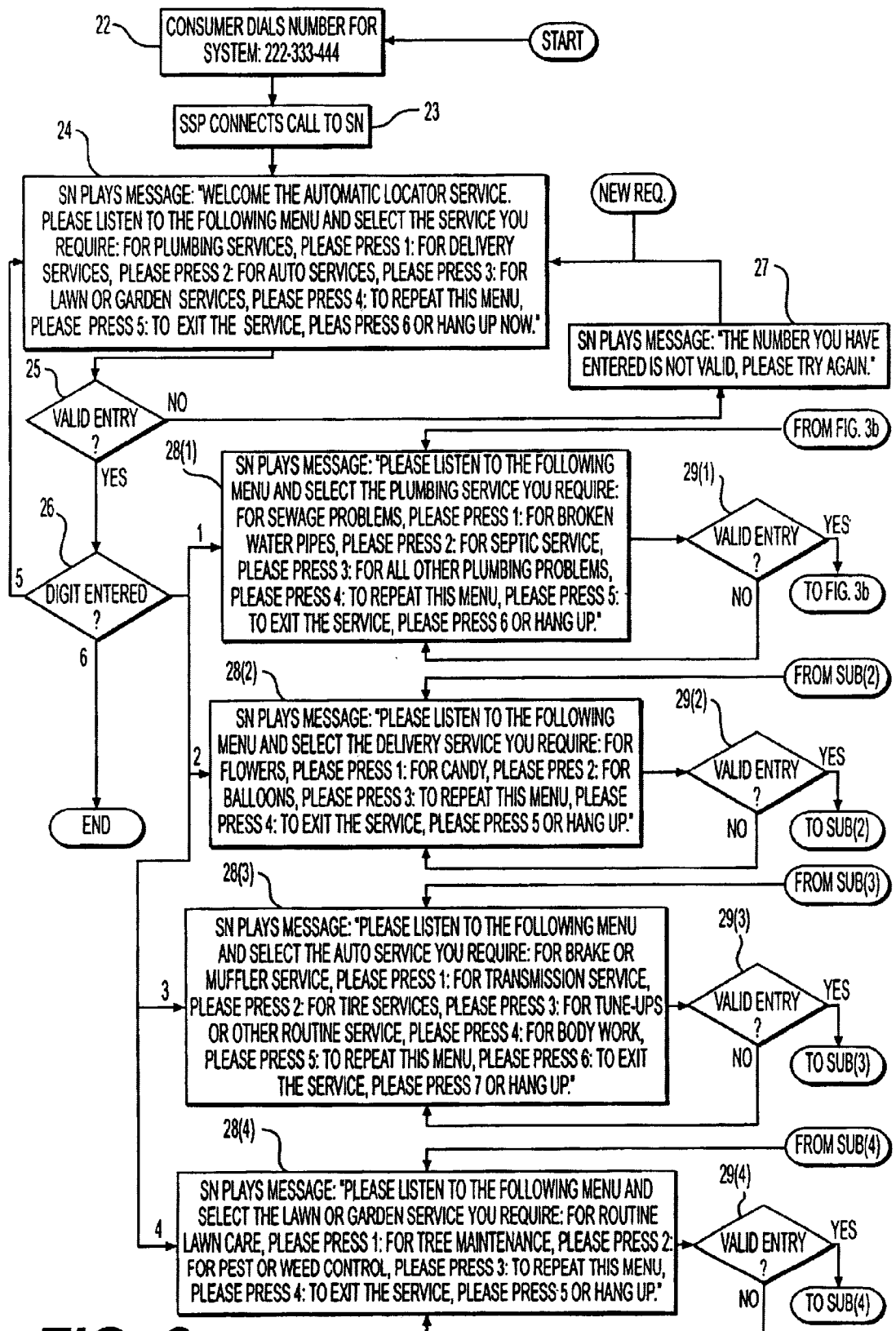
FIGS. 3a–3e are flowcharts showing a portion of the "Information Collection" stage illustrating the steps specifically undertaken in a particular embodiment of the present invention.
Figure 3B:
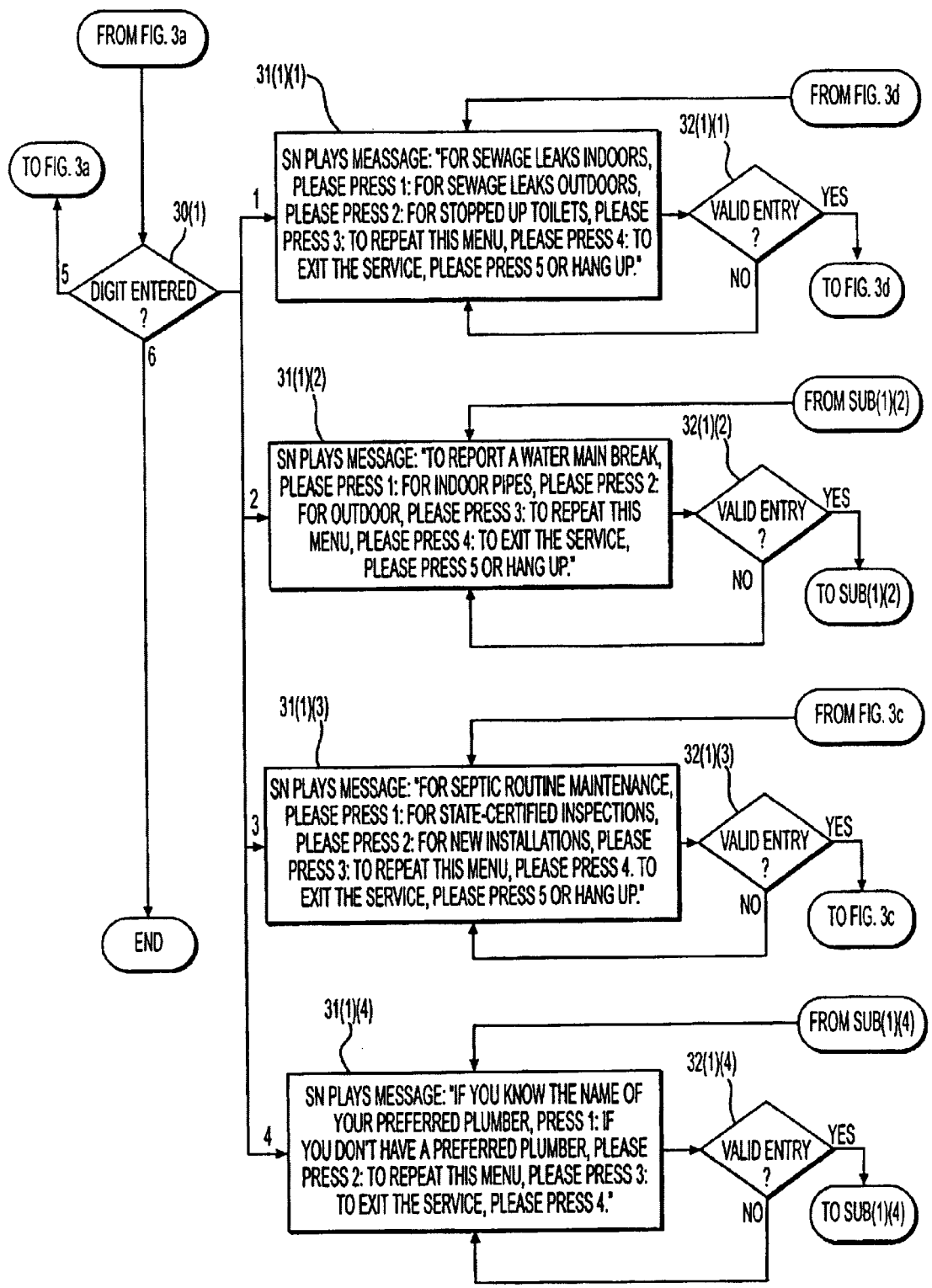

Each option selected by the consumer may have sub-options, and sub-sub-options. In FIGS. 3*a* and 3*b*, sub-functions not explicitly illustrated in the subsequent figures are denoted by SUB(x)(y), where x is the option and y is the sub-option.

If the consumer wants to contact a plumbing service provider, he or she would enter the number '1.' In step 25, SN 2 verifies that the number entered was valid, and in step 26 SN 2 selects the branch corresponding to the option selected. In this example, the consumer selected plumbing services, or option number '1.' In step 28(1), SN 2 plays a pre-recorded message offering the consumer a menu of sub-options related to plumbing services.

In this specific example, the message played is:

Please listen to the following menu and select the plumbing service you require: For sewage problems, please press 1; For broken water pipes, please press 2; For septic service, please press 3: For all other plumbing problems, please press 4. To repeat this menu, please press 5. To exit the service, please press 6 or hang up.

As with step 25, in step 29(1). SN 2 verifies that a valid entry was received in response to the sub-options offered in step 28(1). Once a valid response is received, SN 2 proceeds to step 30(1), starting in FIG. 3*b*. Note that, had the consumer required the auto services, option 3 would have been selected in step 25, and in step 26, SN 2 would have branched out to step 28(3) instead of step 28(1). Continuing with the plumbing example, in step 30(1) SN 2 branches again in response to the consumer's sub-option selection in step 29(1). For example, if the consumer selects sub-option number '1.' a sewage problem, then in step 30(1) SN 2 branches out to step 31(1)(1). Similarly, if the consumer selects sub-option number '2' then the plumbing problem is related to broken water pipes and SN 2 moves on to step 31(1)(2). If the consumer indicates a problem related to septic systems, i.e., sub-option number '3' was entered, SN 2 branches out to step 31(1)(3). If the consumer selects option number '4,' SN 2 proceeds to step 31(1)(4) to gather more information related to "all other plumbing problems." Finally, if the consumer enters the number '5,' SN 2 repeats the menu of choices by returning to step 28(1) in FIG. 3*b*, or if a '6' is entered. SN 2 ends the call.

Assuming, in this example, that the user enters a '1' to select the sewage sub-option, SN 2 then moves on to step 31(1)(1) and provides a second level of sub-options related to sewage problems. In this step, SN 2 plays the following message:

For sewage leaks indoors, please press 1; For sewage leaks outdoors, please press 2; For stopped up toilets, please press 3. To repeat this menu, please press 4. To exit the service, please press 5 or hang up.

In this example, no further sub-options are offered in response to the consumer's answer. Instead, after confirming the validity of the entry in step 32(1)(1), SN 2 proceeds to FIG. 3*d*, step 41, where, e.g., the data gathering stage is completed by asking a series of broad questions pertaining to the service request, steps 42 through 45. In this example, SN 2 gathers information related to the urgency of the consumer's request, step 42. Additionally, SN 2 obtains the consumer's postal zip code in order to determine the geographic area in which the services are required. In an alternative embodiment of this invention, the geographic area could be determined by querying SCP 3 for the consumer's address.

If, in step 28(1), the consumer had selected sub-option '3' to indicate septic services are required, in step 30(1) SN 2 would have branched down to step 31(1)(3). In step 31(1) (3), SN 2 offers a second level of sub-options related to septic services, such as:

For septic tank routine maintenance, please press 1; For state-certified inspections, please press 2; For new installations, please press 3. To repeat this menu, please press 4. To exit the service, please press 5 or hang up.

Figure 3C:
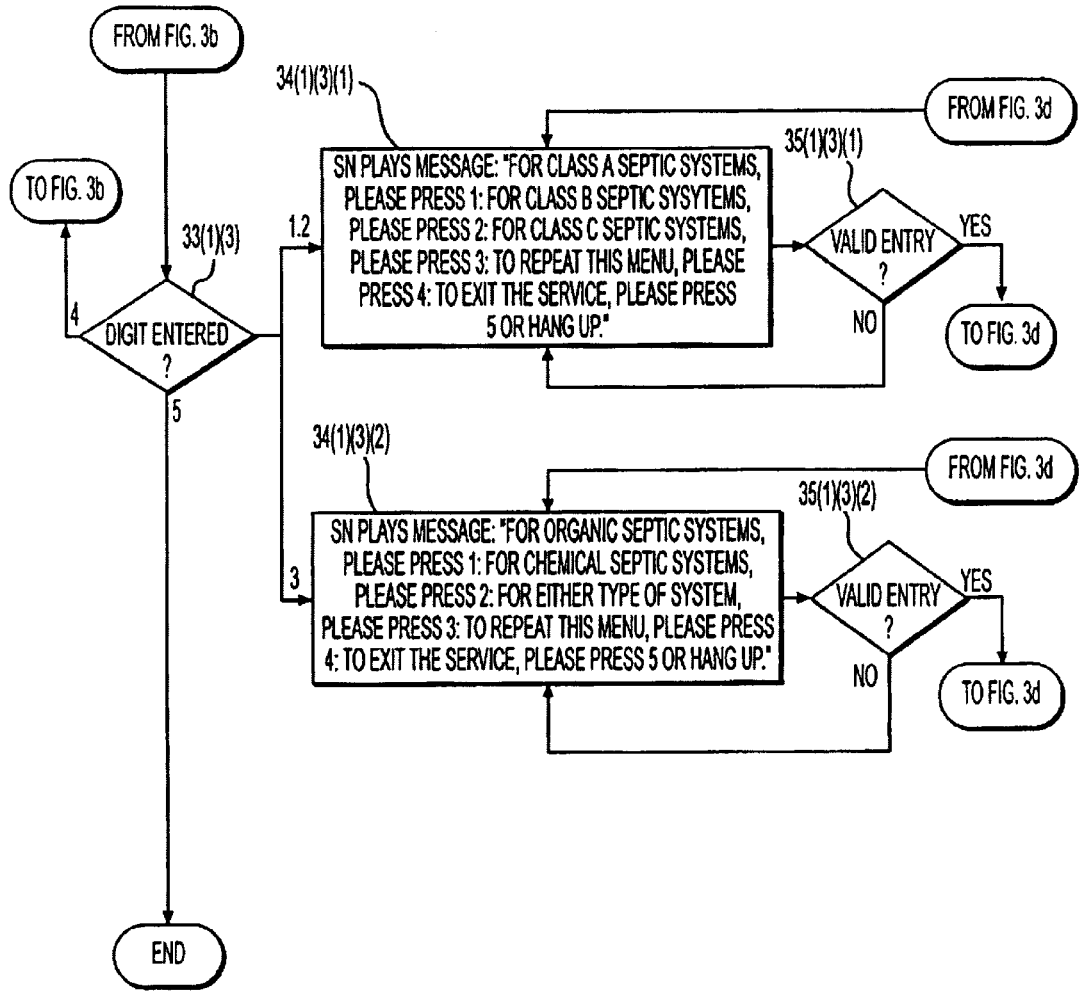

SN 2 verifies the consumer's selection in step 32(1)(3) and proceeds to step 33(1)(3). In this example, if the consumer selects sub-option '1'or '2' SN 2 branches to step 34(1)(3) (1) as shown in FIG. 3*c*. In step 34(1)(3)(1), SN 2 queries the consumer for more information related to septic systems as shown in FIG. 3*c*. After verifying the consumer's entry in step 35(1)(3)(1), SN 2 proceeds to step 41 in FIG. 3*d*. As illustrated in this example, two or more sub-options may result in the same next step. However, the consumer's selection of the sub-option is recorded and used to match service providers.

If the consumer had selected sub-option '3' in step 33(1) (3), indicating he or she needs to have a new septic system installed. SN 2 would have branched to step 34(1)(3)(3) in FIG. 3*c*. Again, after verifying the consumer's input, step 35(1)(3)(3), SN 2 proceeds to step 41 in FIG. 3*d*.

Figure 3D:
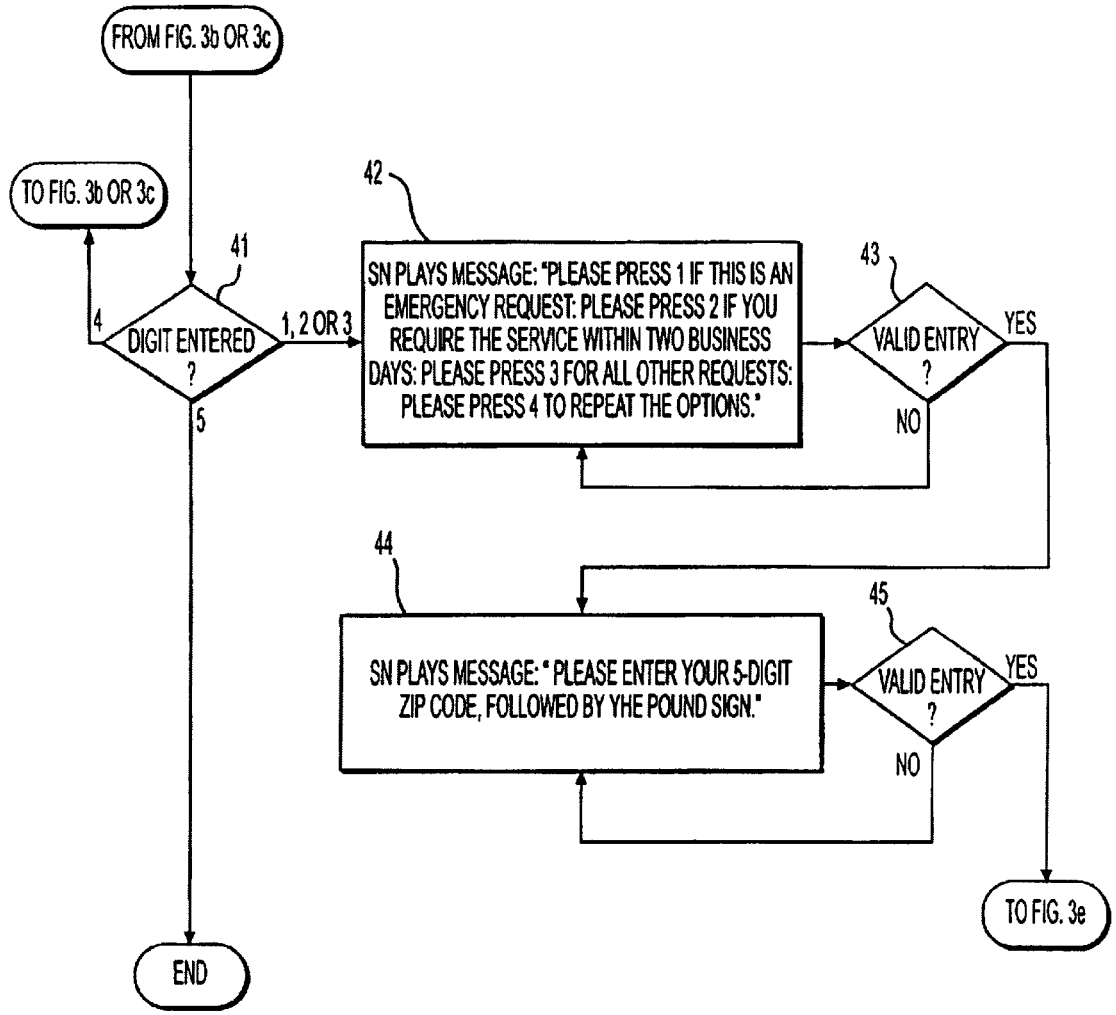

As shown in FIG. 3*d*, SN 2 collects general information from all consumers, regardless of the initial option selected. In this example, in step 42, SN 2 collects information regarding the urgency of the consumer's request. Similarly, in step 44, SN 2 gathers geographic data to determine the service area. In both cases, SN 2 verifies the validity of the consumer's request prior to proceeding to the next step.

Figure 3E:
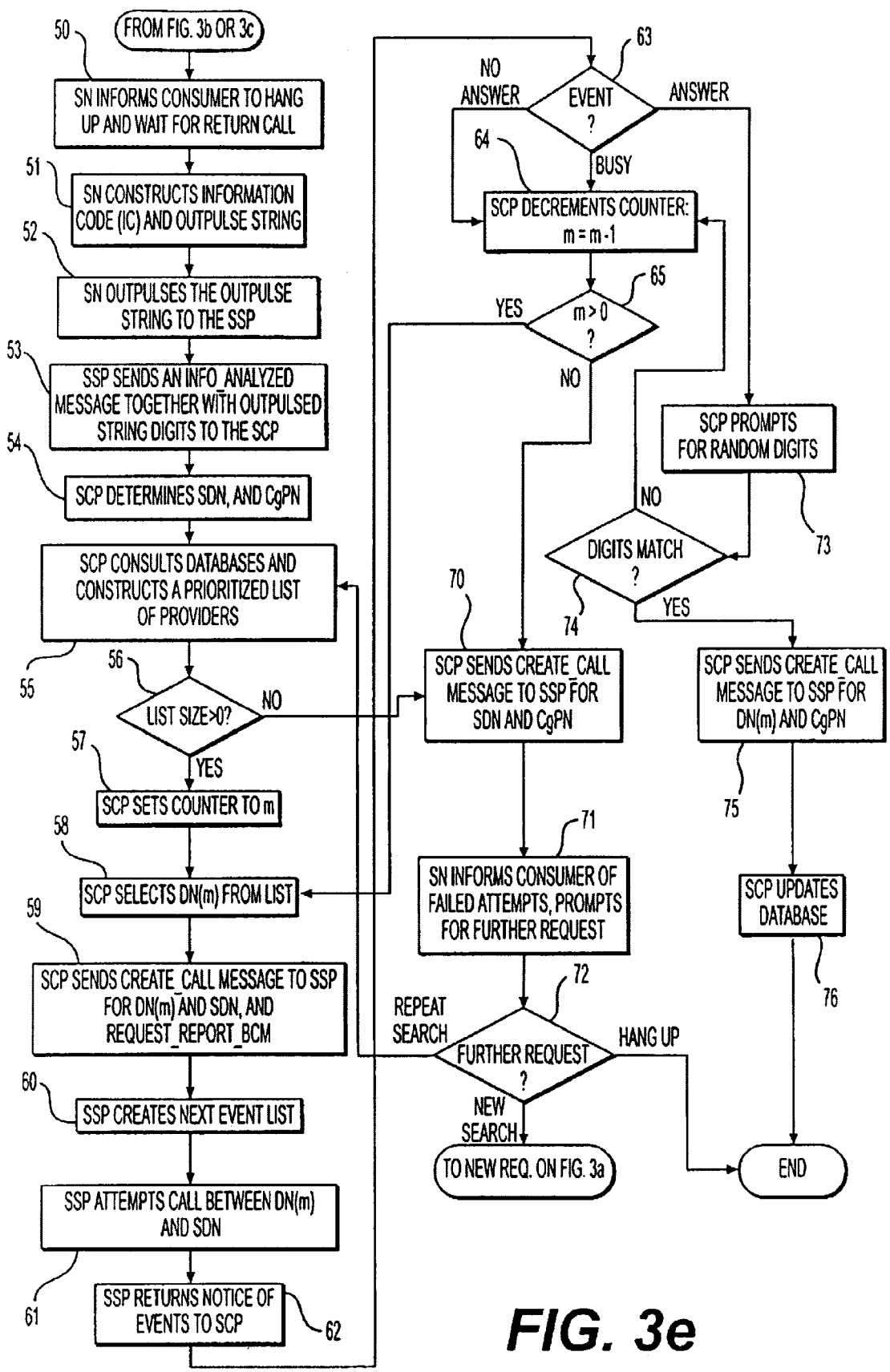

After SN 2 has collected all of the information needed to narrow the consumer's request, it proceeds to step 51 in FIG. 3*e*. In this step, SN 2 constructs an Information Code, up to ten digits in length, that represents the data collected. In one embodiment, the Information Code could merely be a string of all valid entries made by the consumer in response to questions, excluding requests to repeat the menu of options. For example, if the consumer required a state-certified inspection for a class B septic system within two business days, and within the zip code, 20816, the following entries would have been made: '1' for plumbing, '3' for septic, '2' for inspections, '2' for class B systems, '2' for service to be performed within two days, and '20816' for zip code. In this example, the Information Code would thus be: 1322220816.

The Information Code could be encoded based on some other methodology, as long as the consumer's criteria for selecting a service provider are conveyed to the system. For example, if there are only 9 distinct zip codes within the service area, the zip code could be shortened to a single digit. Similarly, the digits collected from the consumer during the Information Collection function need not directly comprise the Information Code.

In steps 51 and 52, SN 2 constructs an outpulse string and sends the string to SSP 1. The outpulse string is composed of the CgPN, obtained in step 23, a Surrogate Directory Number (SDN) resident on SN 2 and the Information Code, developed in step 50. Because the outpulse string has a variable length, between twenty and thirty-two characters, a '#' is used to delimit the end of the string. The SDN allows a call to be completed between SN 2 and the consumer in the event no service provider can be located, steps 70 through 72. In this specific example, the outpulse string would look like: 22255566662223334444413222208l6#, where 2225556666 is the CgPN. 2223334444 is the SDN and 1312220816 is the Information Code.

In step 53, SSP 1 sends an Info_Analyzed message and the outpulse string (without the '#' delimiter) to SCP 3 for analysis and further instructions. In step 54, SCP 3 strips off the CgPN and the SDN and stores them in memory for later use. In step 55, SCP 3 decodes the Information Code and compares the consumer's service request with the database(s) of potential service providers. SCP 3 constructs a prioritized list of service providers which meets the consumer's stated criteria. In step 56, SCP 3 checks to ensure the prioritized list includes at least one service provider.

In the remaining steps, SCP 3 (via SSP 1) initiates contact with the service providers on the list as described in the preferred embodiment above. SCP 3 steps down through the list of service providers until the call is answered by a human being. Once a response from a human being is obtained, the service provider is informed that a consumer requiring specific services will be put on the line and the parties are connected. SCP 3 then updates the database to indicate the successful connection. As described above, if contact with a human was not established the consumer is so informed and has the opportunity to repeat the same search or to request a new search.

Alternate Embodiments

The above described preferred embodiment and the specific example described above could be implemented in alternate ways. For example, instead of a single number for consumers to call to initiate all service requests, several different numbers could be used. For example, plumbing services could be assigned one number, catering another, and lawn care services could have a third number. This embodiment of the present invention might be used to streamline the information collection stage by grouping like service requests together or used to provide different levels of service or billing. For example, one number could be used to handle business customer requests, and a different number could be used to handle private consumers.

In another embodiment of the present invention, the counting mechanism could be initialized with a value of one. In this case, the counter would be incremented to move to the next service provider on the prioritized list.

In another embodiment of the present invention, the database(s) maintained by SCP 3 could be "intelligent," i.e., they could track the success or failures for attempts to contact a service provider. After some predetermined number of failed attempts, SCP 3 could be programmed to drop the provider from the list. Alternatively, SCP 3 could be programmed to include a notice in the service provider's billing statement informing the provider of the lost business opportunities.

In some cases the consumer may wish to repeat the same search a set number of times, or indefinitely until a service provider is actually contacted. In an embodiment of the present invention, in step 24, SN 2 prompts the consumer to enter the number of times the search should be repeated. In this embodiment, SCP 3 determines the number of times to repeat from the Information Code and sets the Redirecting Party ID accordingly.

In another embodiment of the present invention, SCP 3 could be programmed to bill the consumer for using the service or bill the service provider for each attempted call. Because the present invention is implemented on an AIN platform, the database(s) and queries can be altered to satisfy the needs of consumers, business customers, and service providers as desired. For example, the present invention could be implemented using a spelling recognition system, as shown in step 31(1)(4) in FIG. 3*b*.

As will be apparent to one of ordinary skill in the art, the programming logic could be modified to accommodate a wide range of specific requirements. For example, if it is desirable to decrease the time it takes to locate a service provider, the system could be modified to call several service providers at once. In this embodiment, the first service provider to answer the call with a live staff member will be connected to the consumer. In the event of a tie, the service provider having the higher priority would win.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What we claim is:

1. A method of connecting a call between a customer and a service provider comprising the steps of:

receiving a call from a customer;

routing the call to a communications device, the communications device receiving information related to a service requested by the customer;

creating a list of entries, the entries including information related to at least one potential service provider and telephone number associated with the service provider, wherein the potential service provider on the list is related to the service requested by the customer; and wherein the entries are retrieved from a database in communication with the communications device;

the communications device initiating a first telephone call to a first service provider that is among one of the entries, and using a first telephone number associated with the first service provider; and determining if the first telephone call is answered by a machine or by a human being, wherein said step of determining if the first call is answered by a machine or human being comprises:

generating a random set of digits;

providing the random set of digits to an answeror and requesting the answeror to enter a response based on the random set of digits that have been provided; and comparing said random set of digits provided to the answeror to the response entered by said answeror, wherein a match of said random set of digits provided to said answeror to said response entered by said answeror indicates a human answeror.

2. The method according to claim 1, further comprising the step of completing the first telephone call between the customer and the first service provider if the first telephone call is answered by a human being.

3. The method according to claim 1, wherein a geographic location associated with the caller is determined.

4. The method according to claim 3, wherein the entries also include information related to the geographical location of the caller.

5. The method according to claim 3, wherein the geographic location of the caller is determined by querying an SCP.

6. The method according to claim 1, wherein the list is created prior to the initiation of a telephone call.

7. The method according to claim 1, wherein the communications device is an AIN device.

8. A method of connecting a call between a customer and a service provider comprising the steps of:

receiving a call from a customer;

sending the call to a communications device, the communications device receiving information from the customer related to a service requested by the customer;

creating a list of entries, the entries including information related to a plurality of service providers and corresponding telephone numbers for those service providers, wherein the plurality of service providers on the list are related to the service requested by the customer;

ordering the list according to at least one pre-selected criteria;

selecting a first service provider that is one of the plurality of service providers, a first telephone number being associated with the first service provider; and initiating a first telephone call to the first service provider by using the first telephone number; and determining if the first telephone call is answered by a machine or by a human being, wherein said step of determining if the first call is answered by a machine or human being comprises:

generating a random set of digits;

providing the random set of digits to an answeror and requesting the answeror to enter a response based on the random set of digits that have been provided; and comparing said random set of digits provided to the answeror to the response entered by said answeror, wherein a match of said random set of digits provided to said answeror to said response entered by said answeror indicates a human answeror.

9. The method according to claim 8, wherein the criteria is related to a geographic location associated with the caller.

10. The method according to claim 8, wherein the criteria is associated with cost.

11. The method according to claim 8, wherein the criteria is associated with a geographic location associated with the service provider.

12. The method according to claim 8, wherein the criteria is associated with the plurality of service providers' hours of operation.

13. The method according to claim 8, wherein the criteria is associated with the success rate of establishing contact with a human being.

14. The method according to claim 8, wherein the criteria is associated with customer feedback.

15. The method according to claim 8, wherein the list is created prior to the initiation of a telephone call.

16. The method according to claim 8, wherein the communications device is an AIN device.

* * * * *